Sept. 6, 1966  R. G. DUNLOP  3,271,486
METHOD OF PRODUCING AN ARTICLE FOR SIMULATING A DRINKING
GLASS CONTAINING A DRINK
Filed Jan. 9, 1963  2 Sheets-Sheet 1

Inventor
Robert George Dunlop
By Dowell McDowell
Attorneys

United States Patent Office 3,271,486
Patented Sept. 6, 1966

3,271,486
METHOD OF PRODUCING AN ARTICLE FOR SIMULATING A DRINKING GLASS CONTAINING A DRINK
Robert George Dunlop, Glendow House, Oakmere, Potters Bar, England
Filed Jan. 9, 1963, Ser. No. 250,322
4 Claims. (Cl. 264—45)

This invention relates to the manufacture of objects simulating a drinking glass containing a beverage.

Various materials have been used for this purpose but none of them has been successfully used either because of undesirable physical characteristics or because the quality of the simulation was not satisfactory. Glass moldings have also been produced but the degree of simulation which can be produced in this manner is altogether inadequate.

An object of the invention is the production of an article which very faithfully simulates a glass partly filled with any of the usual drinks such as champagne, wines of various kinds, spirits, and so on.

Fundamentally, the invention consists in using an ordinary drinking glass as a mold for the material used for simulation of the contents of the glass, this material being prepared from a polymerisable liquid, or syrup, which is hardened by the addition of suitable catalysts. It has been found that by a judicious choice of polymerisable material, a degree of simulation of many different kinds of drinks can be obtained which is far superior to that which anyone has so far been able to produce.

The polymerisable material must be of a kind which if it contracts on setting must still adhere to the sides of the glass, in order to achieve realistic simulation of a drink in the drinking glass.

The term "drinking glass" used in the specification includes all transparent drinking vessels made from glass and other materials such as transparent plastics, and also any article simulating a drinking glass.

The polymerisable material for use in accordance with the invention may, for example, be prepared from methyl methacrylate, butyl methacrylate or ethyl acrylate. These materials can be polymerised in any known way but preferably by the addition of an activated catalyst system in suitable proportions. The product can be made flexible to a suitable degree by the addition of a suitable plasticiser.

Examples of plasticisers which may be used include the following: di butyl phthalate, di octyl phthalate, tri tolyl phthalate, di butyl phosphate, tri tolyl phosphate, di butyl sebacate.

After the mixture has been prepared and activated it is poured into an ordinary drinking glass where it will polymerise and adhere strongly to the wall of the glass.

In order that the moulded material may simulate any particular drink, coloring matter is added during preparation of the plastic.

In order to make the whole process economic, the best procedure is to mix the various ingredients in a quantity suitable for a number of glasses. The materials having been mixed in the liquid state, the mixture is poured in appropriate quantities into the various glasses and left there to polymerise. All usual precautions must, of course, to be taken such, for example, as chemically cleaning the glasses before use. Adhesion of the polymerised cement to the glass surface may be obtained by the use of a suitable glass primer such as vinyl tri chloro-cilane. If, in order to simulate a given drink, the prepared polymerised material has to contain more than about 30% plasticizer, the exposed surface after molding may be tacky and tend to hold dust. To overcome this disadvantage a thin layer of cement containing plasticizer content between 0%–30% is poured on to the exposed surface to produce a sufficiently hard surface which can easily be wiped free from dust.

In the case of some drinks such, for example, as champagne the presence of bubbles is essential for good simulation. It is found that such bubbles can be simulated by judicious stirring or agitating of the plastic mass before it has set. In particular it has been found that the insertion into the material of a small diameter wire or rod will produce a line of bubbles similar to those which are seen to rise from the bottom of a glass of champagne to the surface. For the production of realistic bubbles it is necessary to use just the right degree of agitation while the material is in the most appropriate physical state. The optimum conditions have to be established in any particular case by trial and error.

It is a characteristic of other drinks that they have froth on the surface which is exposed to the air.

Such froth can be simulated by more intense agitation of the plastic in the glass near its upper surface at the appropriate time. This can be done, for example, by the use of a paddle or, by the addition of blowing agents. Alternatively, an excess of accelerator (about five times the amount normally used during the molding operation) can be added to the polymerised materials after molding. Again, the optimum conditions of operation have to be determined in any particular case by trial and error.

In certain instances the froth may be prepared separately by any of the above methods and then poured on top of the previously molded polymerised material.

In order that the invention may be more thoroughly understood two examples of the manufacture of simulated drinks in accordance with it will now be described in some detail, with reference to the accompanying drawing in which.

EXAMPLE I

*A simulated champagne drink*

This can be made from a mixture of the following composition—Parts by weight: 42 methyl methacrylate monomer, 18 methyl methacrylate granular polymer, 40 di butyl phthalate, 0.3 di methyl p. toluidine, 0.3 benzoyl peroxide.

This may be colored with an oil soluble dye to simulate the color of champagne. This mixture is poured into a champagne glass and after 30 minutes a fine wire is inserted into the mass and then withdrawn at places where streams of bubbles are required. Five minutes later fine streams of small bubbles form where the wire has been inserted. On cooling these bubbles enlarge slightly.

Figure 1:
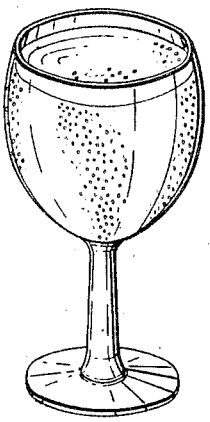
FIGURE 1 is a perspective view of a glass containing simulated champagne.

A small amount, say 10 parts by weight of the above composition without plasticiser but with a normal catalyst system is now poured over the exposed surface where it is allowed to polymerise to produce a smooth hard surface resulting in the product shown in FIGURE 1.

EXAMPLE II

*A simulated beer drink*

This can be made from a mixture of the following composition—Parts by weight: 42 methyl methacrylate monomer, 18 methyl methacrylate granular polymer, 40 di butyl phthalate, 0.3 di methyl p. toluidine, 0.3 benzoyl peroxide.

Figure 2:
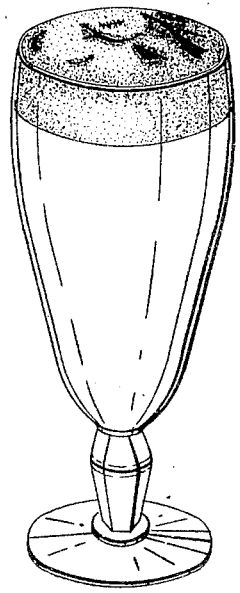
FIGURE 2 is a perspective view of a glass of simulated beer.
Figure 4:
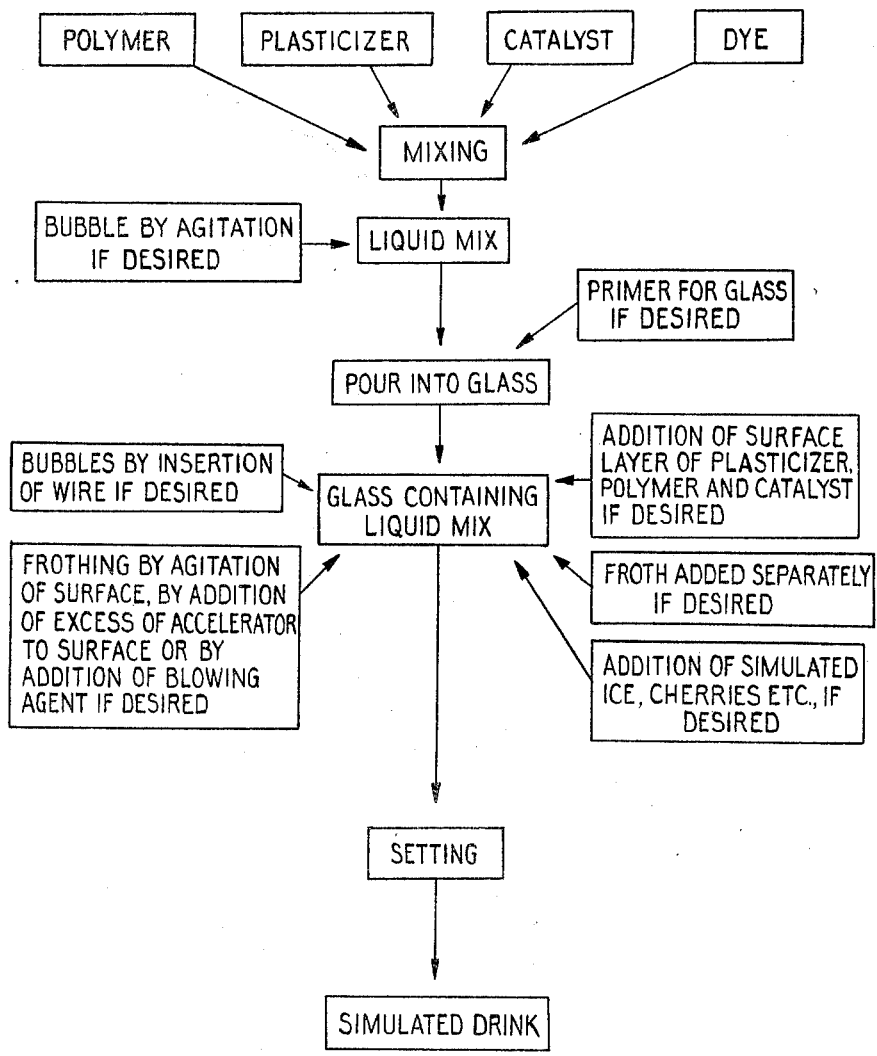
FIGURE 4 is a diagram illustrating the steps in producing a simulated drink in accordance with the invention.

After adding a suitable mixture of soluble dyes to simulate the color of the beer required. This is poured into an appropriate glass where in about 35 minutes polymerisation takes place. A further 25 parts of the cement, without plasticiser and with parts adjusted to 100, is colored to a suitable color, and to this is added a further 0.3 part of accelerator. This solution is poured on to the previously polymerised colored mass when after 15 minutes, frothing takes place. The froth hardens to produce a realistic foam or "Head" which is bonded to the upper surface of the polymerised mass. A product produced by this method is illustrated in FIGURE 2.

Many drinks are normally consumed with the addition of solid bodies such, for example, as pieces of ice, cherries and so on. A realistic simulation can be achieved by the use of objects simulating such bodies and introduced into the polymerised material in the glass before it has completely set. Thus a block simulating a piece of ice can be made from a polymethyl methacrylate granular polymer/methyl methacrylate monomer slurry suitably hardened in a mold by the application of heat and pressure. The molded block may be cut to shape, introduced into, or partially into, the polymerisable cement before it completely polymerises. Glazing and hardening of the surface is obtained by the method above.

Figure 3:
FIGURE 3 is a perspective view of a glass of a simulated gin cocktail having in it a cherry on a stick and a piece of lemon.

FIGURE 3 shows a glass of a simulated gin cocktail having set in it a cherry on a stick and a slice of lemon.

In the case of objects such as cherries, olives, slices of lemon and so on, which are normally wholly immersed in a drink the real objects may be used after suitable preparation instead of simulations of them.

By means of the invention surprisingly faithful simulations of a very wide range of drinks can be obtained so that the invention lends itself to valuable use in the advertising field.

I claim:

1. A method of producing an article for simulating a drinking glass containing a drink, comprising pouring into a drinking glass a polymerisable mixture, which by activation with a suitable catalyst system forms a solid material simulating the drink, the pouring being effected under conditions of temperature which will not damage the glass, the polymerisable liquid then being allowed to harden but before it is set being agitated near its upper surface so that when it sets the existence of a froth is simulated.

2. A method of producing an article for simulating a drinking glass containing a drink, comprising pouring into a drinking glass a polymerisable mixture, which by activation with a suitable catalyst system forms a solid material simulating the drink, the pouring being effected under conditions of temperature which will not damage the glass, allowing the polymerisable mixture to harden and before it has set stirring it with a small diameter rod or wire to produce bubbles which are imprisoned in the material when it sets and simulate the bubbles of an effervescent drink.

3. A method of producing an article for simulating a drinking glass containing a drink, comprising pouring into a drinking glass a polymerisable mixture, which by activation with a suitable catalyst system forms a solid material simulating the drink, the pouring being effected under conditions of temperature which will not damage the glass, allowing the polymerisable liquid to harden, and pouring over the exposed surface of the polymerised material in the glass a thin layer of an unplasticised polymerisable material to provide the drink simulating material with a hard smooth surface simulating that of a liquid.

4. A method of producing an article for simulating a drinking glass containing a drink, comprising pouring into a drinking glass a polymerisable mixture, which by activation with a suitable catalyst system forms a solid material simulating the drink, the pouring being effected under conditions of temperature which will not damage the glass, allowing the polymerisable material to partially set and introducing into the material before it has set a solid body simulating an object normally found in the drink.

References Cited by the Examiner

UNITED STATES PATENTS

| | | | |
|---|---|---|---|
| 2,140,327 | 12/1938 | Mould | 272—8 |
| 2,141,760 | 12/1938 | Mould | 272—8 |
| 2,747,230 | 5/1956 | Magnus | 264—275 |
| 2,764,516 | 9/1956 | Pace | 264—45 |
| 2,972,170 | 2/1961 | Birckhead et al. | 260—2.5 XR |
| 3,032,826 | 5/1962 | Brillinger | 264—45 |

OTHER REFERENCES

Horn, Milton B.: Acrylic Resins, N.Y., Reinhold Pub. Corp., © 1960, pp. 45 and 46.

United States Plastic Corp., "Tamco plastic supplies for factory, plating, laboratory, photography, chemical processing or where dry or liquid corrosive action is caused by acids, salts, alkalies or other chemicals." Catalog No. 63–2, Lima, Ohio (1963), p. 4.

ALEXANDER H. BRODMERKEL, *Primary Examiner.*

P. E. ANDERSON, *Assistant Examiner.*